Feb. 28, 1956  G. L. WILSON  2,736,522
AIRCRAFT LOAD EJECTION DEVICE
Filed Aug. 21, 1953
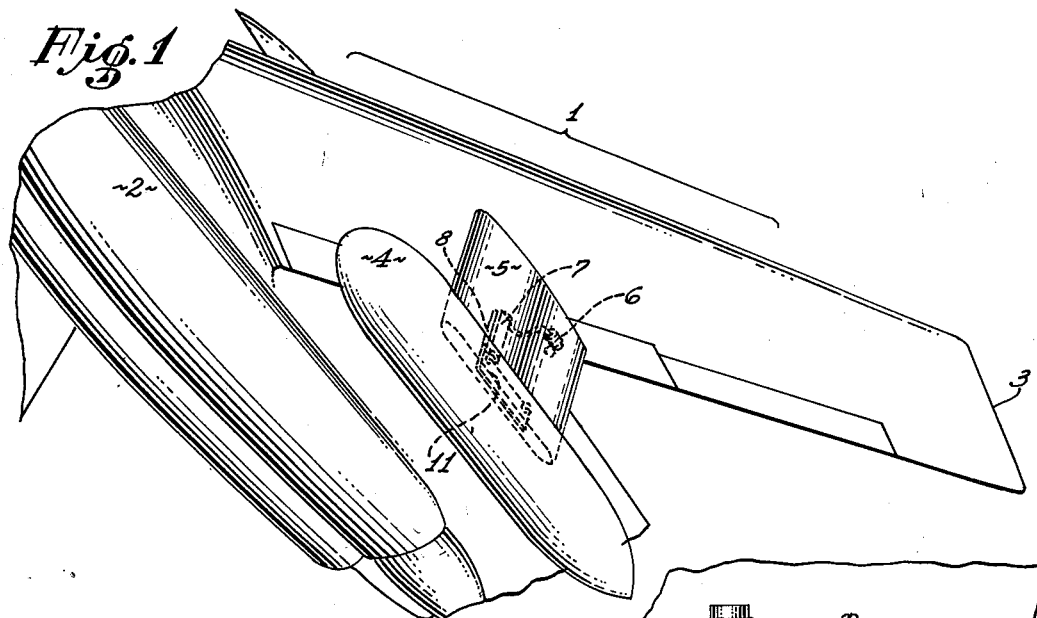
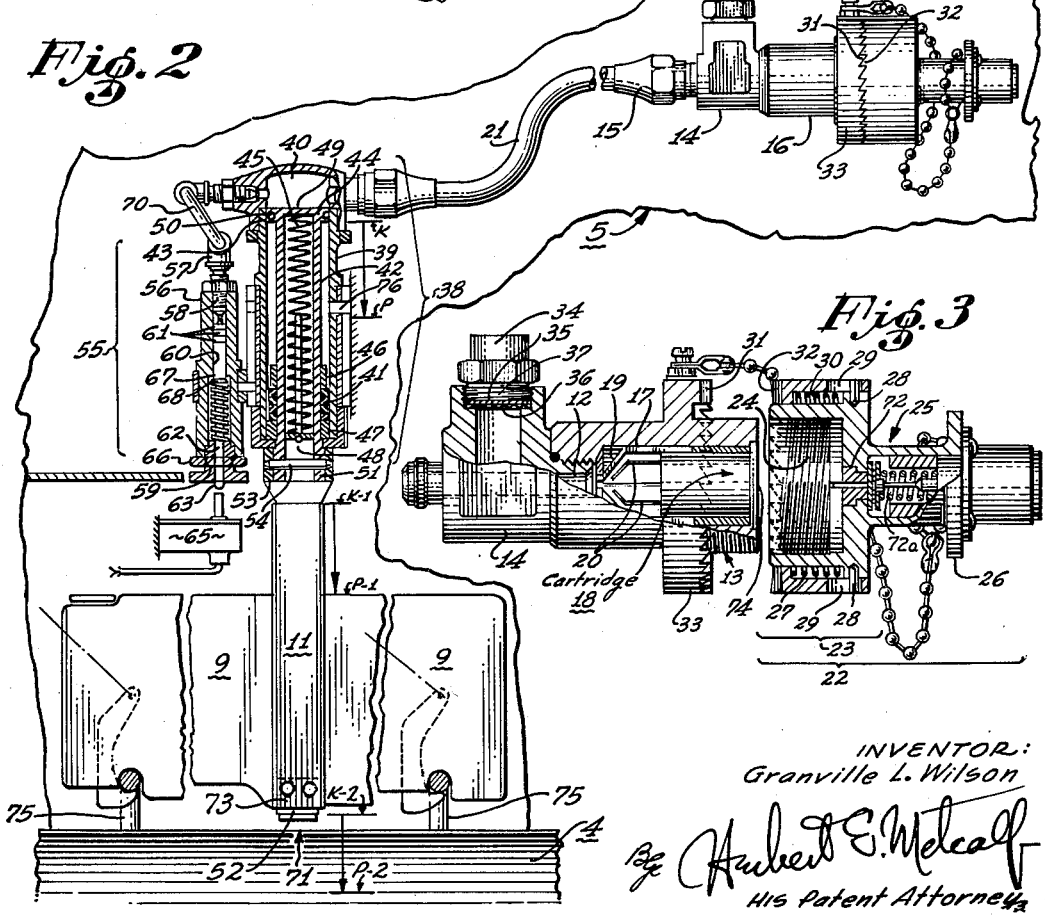
INVENTOR:
Granville L. Wilson
By Hubert E. Metcalf
His Patent Attorney

United States Patent Office 2,736,522
Patented Feb. 28, 1956

2,736,522

AIRCRAFT LOAD EJECTION DEVICE

Granville L. Wilson, Huntington Park, Calif., assignor to Northrop Aircraft, Inc., Hawthorne, Calif., a corporation of California Application August 21, 1953, Serial No. 375,727

9 Claims. (Cl. 244—137)

This invention relates to devices for releasably attaching external stores cells to airplanes, and more particularly to such devices having means for forcing the released cell away from the aircraft.

As the speed of modern airplanes carrying underwing fuel tanks, bombs and other external stores cells has been increased and the flow of air around the airfoils becomes more rapid and powerful, there has been a proportionate increase in the tendency of the airflow to induce erratic and unpredictable movements of stores cells released from the airplanes. The force of gravity alone can no longer be depended upon as a means for getting the released external stores cell free of the attachment shackles and safely out of the flight path of the airplane.

An object of this invention is the provision of means for forcing the external stores cell away from an airplane immediately upon release of the attaching shackles.

Other important and closely related objects of this invention include: the provision of means for both releasing and ejecting stores cells; means wherein the operational steps are inherently co-dependent, and their proper sequencing and timing assured; and means by which a single power source is utilized to effect both the releasing and ejecting mechanical functions.

Additional objects of this invention include the provision of stores cell releasing and ejecting means adapted to be adjustable with reference to the timing of its operational steps, having suitable back pressure relief means, and adapted mechanically to permit manual reloading of a cartridge chamber with a cartridge used to supply power to the mechanism, without the use of special tools.

In brief, my invention consists of a device which provides the accurately synchronized lineal movement of two actuating arms and includes an airtight chamber in which an explosive cartridge is fired to generate gas pressure successively in two cylinders thereby displacing their pistons and causing one extending piston arm to contact an attachment shackle release switch, and the other piston arm to exert direct outward thrust against the surface of the stores cell and force it away from the airplane.

This invention possesses other objects and features of novelty which will become apparent in the following description of one preferred mechanical embodiment of the invention, and this description will be more clearly understood through reference to the accompanying drawings in which:

Figure 1 is a fragmentary perspective view from below of a portion of the fuselage and left wing of an airplane equipped with a typical outboard stores cell suspended from a midwing pylon.

Figure 2 is a view in longitudinal section with some parts unsectioned showing the mechanical components included in the ejector release system of this invention.

Figure 3 is an enlarged longitudinal sectional view of the cartridge chamber assembly.

Referring now to Figure 1, the numeral 1 indicates the wing, 2 a portion of the fuselage, 3 the left wing tip, and 4 stores cell suspended beneath the wing on pylon 5. The location within the pylon 5 of the device of my invention is indicated in broken lines and will serve to establish the positioning of its cartridge chamber 6, ejector cylinder 7, switch actuating cylinder 8, and yoke 11, with relation to the pylon 5 and the stores cell 4. The yoke 11 straddles a standard form of rack 9 in which are arranged load supporting means and electrically operated mechanism for releasing said supporting means. The rack and its associated mechanism form no part of this invention.

The cartridge chamber 6, with breech cap attached, shown in side elevation in Figure 2, and in longitudinal section and fragmentary cutaway in Figure 3, includes a main body portion, generally tubular in conformation and consisting of three tubular sections, each smaller in diameter than the preceding, the largest section 33 being at the breech end 13 of the chamber and the smallest 14 leading to a pressure line coupling 15. Positioned in the longitudinal center of the center chamber section 16 is an inner sleeve member 17 in Figure 3, adapted to receive and hold a pressure generating cartridge in firing position. The sleeve 17 is terminated inwardly in a conical cap member 19 composed of material adapted to restrain the flame and flying remnants of the cartridge shell following its explosion. A series of longitudinal slots 20 through which the gases generated by the explosion of the cartridge can escape into the chamber 12 and thence to the pressure line 21 are disposed in generally radial arrangement in the conical periphery of the cap 19.

Opening from the smallest chamber section 12 is a tubular aperture 34 in Figure 3 adapted to provide emergency outlet for excessive back pressure which would build up in the event of operational failure of the actuating cylinders or jamming of the electrically operated attachment shackle release device. Normally the aperture 34 is sealed by a frangible metal disc 35 protected by an asbestos disc 36 and held in place by a removable inner bushing 37.

The breech cap assembly 22 includes a cup-shaped main body portion 23 suitably threaded at 24 to screw down over the breech end 13 of the cartridge chamber, and having a tubular extension of diminished diameter extending outwardly from its transverse section to form a cylindrical housing 25 for an axially disposed contact pin 72 urged toward the cartridge by spring 72a and an attachment plate 26 for an electrical receptacle.

Fitted about the circumferential surface of the breach cap body portion 23 is a cylindrical sleeve 27 movably attached to the body portion by means of rollpins 28 which protrude from the body portion through longitudinally disposed slots 29 in wall of sleeve 27. Compression spring 30 positioned between the sleeve and body portion, and in the same axial alignment, holds the sleeve in lateral alignment with the body portion and thereby holds radially disposed teeth 32, cut in its inward edge, extended inwardly and engaged with mating teeth 31 cut in the facing edge of a collar 33 which, in turn, is an extension of the body portion 16 of the cartridge chamber. Thus when cap 22 is screwed down on chamber end 13, extending teeth 32 on sleeve 27 bear against and slide over teeth 31 on collar 33 since the spring 30 permits the sleeve 27 to move away from collar 33 as required. When chamber end 13 bottoms in the cap 23, the mating teeth 31 and 32 move into complete engagement, holding the cap against reverse rotation in position. Moving the sleeve away from collar 33 disengages teeth and permits unscrewing the cap.

Pipe line 21, in Figure 2 leads to ejector cylinder assembly 38 which includes a main cylindrical portion 39 enclosing a high pressure chamber 40 in its top and having a plurality of resilient, compressible damping rings 41 disposed between its inner wall and the outer circumferential periphery of tubular piston member 42. Above the damping rings 41 is a loose fitting shock absorbing ring 46, and below and aligning with the opening 48 of the cylinder 39 is a pressure sealing ring 47. The piston member 42 is generally tubular in conformation, closed at one end 49, and adapted to move longitudinally within the cylinder 39 supported circumferentially by the sealing ring 47 and the circumferential edge 43 of a flanged section of increased diameter 44 adjacent its closed end 49, the flange edge 43 being suitably grooved to receive and retain a pressure sealing ring 50. A helical spring 45 longitudinally disposed in the hollow interior of the piston serves to return the piston to its normally retracted position after completing an outward stroke. To a section of the piston 51 extending beyond the cylinder 39, a yoke member 11 which terminates in a pressure plate 52 is attached by means of a socket 53 and through bolt 54. The yoke 11 consists of two parallel, longitudinally extending arms, one on each side of the rack 9 and its releasing mechanism, and secured in spaced relationship at their outward ends 73, by mutual attachment to the pressure plate 52. The releasing mechanism contained in the rack 9 per se forms no part of the present invention and will not be described more specifically.

Thus the yoke straddles the rack 9 containing the releasing mechanism, and its outward and returning movements are not impaired thereby.

Located in the underwing pylon 5, adjacent to and paralleling the ejector cylinder assembly 38, is a secondary actuating cylinder assembly 55 comprising an outer cylinder member 56 having a pressure line attachment fitting 57 and pressure accumulation chamber 58 at its head end and a closure bushing 59 threaded into its opposite end and secured in place by lock nut 66. The inner bore of the cylinder 56 is small compared to that of the companion cylinder 39 and consists of a large initial bore threaded to receive closure bushing 59, an intermediate bore of slightly smaller diameter terminated with a chamfered inner shoulder 67 leading to a third bore of further reduced diameter continuing through to the top of the cylinder body 58. The rod like piston member consists of a head section 60, suitably grooved circumferentially to receive a plurality of pressure sealing rings 61, and expanded circumferentially at its lower end to provide a bevelled flange 68 adapted to bear against chamfer 67 when returned to retracted position by spring after making outward thrust. The lower piston section 62 is actually an extension in reduced diameter of head section 60 and is provided suitable bearing surface for longitudinal movement by an axial bore in closure bushing 59 through which piston end 63 protrudes adjacent to pressure actuated switch 65.

Fluid pressure is diverted from the compression chamber 40 of ejector cylinder 38 through a pressure line 70 of relatively small diameter to the pressure accumulation space 58 adjacent piston head in the small cylinder 55.

Operation of the coordinated releasing and ejecting operations is initiated by closing a remote switch (not shown), and is practically instantaneous. Closing the remote switch completes an electrical circuit through contact pin 72 to primer end 74 of cartridge 18, igniting the explosive material therein and firing the cartridge. Explosion of the cartridge generates pressure transmitted through pressure line 21, in large cylinder head 40 which moves the piston 42 of the large cylinder 38 outwardly and its pressure plate 52 into firm contact with the stores cell surface 71. As the pressure builds up in cylinder head 40 it bleeds over through small pressure line 70 into space 58 in head of the small cylinder 55 forcing its piston 60 outwardly and its piston end 63 into contact with pressure sensitive switch 65 which, in turn, activate the mechanism contained in rack 9 for releasing the shackles 75 on the stores cell 4.

Immediately thereafter, the pressure within cylinder head 40 builds up until it overcomes the inward pressure of coil spring 45 and depresses piston 42 until its flanged head 44 passes exhaust port 76 through which the pressure escapes from the cylinder. Movement of the piston head from point K to point P causes movement of the yoke shoulder from point K–1 to P–1, and the pressure plate 52 from K–2 to P–2, thereby pushing the stores cell 4 away from the airplane and into the airstream.

While in order to comply with the statute, this invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. In an airplane having a releasable externally carried stores cell fitted with securing means, and means permanently mounted on the plane and engaged with said securing means but releasable therefrom; releasing means comprising: a first pressure cylinder having a piston with a piston rod extending outwardly from said cylinder; a pressure plate actuated by said piston and adapted to exert outward thrust against a stores cell positioned adjacent thereto; a second cylinder having a piston with a piston rod extendable therefrom; a pressure switch actuated by the piston of said second cylinder to operate the permanently mounted means to release the securing means of the stores cell; means for producing a supply of fluid under pressure at said cylinders; means to establish the relative sequence and timing of movements of said pistons to assure movement of said pressure plate into firm pressure-loaded contact with said stores cell in advance of the operation of said pressure sensitive switch and subsequent outward thrust of said pressure plate; and means, remotely controlled, for directing fluid under pressure into said cylinders to extend said pistons, release the stores cell and force it away from the airplane.

2. Apparatus in accordance with claim 1 in which the means for producing a supply of fluid under pressure comprises: a firing chamber adapted to receive a pressure generating cartridge; a pressure overload safety valve opening from said chamber; a pressure tight breech cap closing one end of said chamber; a pressure line leading from said chamber to the head of the first of said cylinders wherein, upon firing of the cartridge, sufficient pressure is accumulated to depress the pistons in both cylinders to thereby release and thrust away said stores cell.

3. Apparatus in accordance with claim 1 in which the means for creating pressure at the cylinders comprises: a firing chamber adapted to receive a self-fused pressure generating cartridge; a pressure overload safety valve opening from this chamber; a pressure tight breech cap; a pressure line leading from said chamber to the heads of said cylinders wherein, upon firing of said cartridge, sufficient pressure is accumulated to depress both pistons thereby releasing said stores cell and thrusting it away from the plane.

4. Apparatus in accordance with claim 3 in which said pressure overload safety valve comprises: a generally tubular outlet, opening laterally from said firing chamber, counterbored and threaded internally from its open end spaced from said firing chamber said counterbore being terminated at its inner end in a circumferential shoulder; a threaded sleeve member fitting within said tubular member, its inner end adapted to bear against said circumferential shoulder; a first disc being heat resistant and flame repellant; a second disc being non-porous, having a predetermined elastic limit and being readily frangible when overloaded, both of said discs being insertable through the threaded portion of said tubular member and held in position against said counterbore shoulder by said threaded sleeve member, said elastic limit of said frangible disc being high enough to withstand the pressure required to operate said pistons, yet low enough to assure shattering of said disc, in the event of operational failure, before sufficient pressure accumulates to damage said pressure lines or mechanism.

5. Apparatus in accordance with claim 1 wherein the outward thrust of said pressure plate is transmitted around a rack mounted below the first and second cylinders to said stores cell by means comprising: a yoke member disposed concentrically with the longitudinal axis of said piston and piston rod with two longitudinal arms perpendicular to said piston rod, one end of each arm being attached to said piston rod end, the other yoke arm end being juxtaposed with and attached to said pressure plate.

6. Apparatus in accordance with claim 1 wherein a pressure exhaust outlet is provided in the lower side wall of said first cylinder and coil springs are disposed below said pistons in said cylinders, said springs being adapted to urge said pistons upward within said cylinders and being strong enough to move said pistons when unopposed by internal fluid pressure, whereby said first piston as it completes said outward thrust moves downward within said cylinder below said pressure exhaust outlet thereby dissipating the force of said fluid pressure within said cylinders and permitting said coil springs to move said pistons upward and return their respective piston rods to their original positions in said cylinders within the fairing of said aircraft.

7. Apparatus in accordance with claim 1 in which said means to establish the relative sequence and timing of movements of said pistons comprises: a conduit for fluid under pressure connecting the space within the head of said first cylinder with the space within the head of said second cylinder; a restrictor conduit between said cylinders, to slow down the transmission of pressure fluid from said first cylinder to said second cylinder until sufficient pressure accumulates in said first cylinder to depress said piston therein and move said pressure plate into firm contact with the surface of said stores cell, said restrictor conduit being further adapted to permit passage of pressure fluid into said second chamber before sufficient pressure accumulates to operate said pressure overload safety valve in said firing chamber, thereby assuring that adequate pressure is available and that said ejector will operate immediately upon depression of said pressure sensitive switch.

8. Apparatus in accordance with claim 1 in which said remotely controllable means for introducing said pressure fluid into said cylinders comprises: a firing chamber adapted to receive and support an internally fused pressure generating cartridge; a pressure conduit leading from said firing chamber to the interior of the head of said first cylinder; a pressure tight breech cap, closeable over the primer end of said cartridge; and an electrical contact member positioned in said breech cap and contacting the primer end of said cartridge to transmit an electrical charge to said fusing material to ignite said pressure generating cartridge.

9. Apparatus in accordance with claim 8 in which said pressure tight firing chamber breech cap comprises: a substantially cylindrical main body portion having at one end an axially aligned tubular extension terminated in a radially extending flange, and being internally threaded at the other end to engage external threads on the breech end of said firing chamber body; a pin-like electrical contactor supported coaxially within and extending from said tubular extension; a spring urging said contactor against the primer end of the cartridge; an electrical receptacle attached to said flange in which a connection is made between a power supply line and said electrical contactor; a hollow sleeve section having radially cut face teeth in one of its circular end edges and a longitudinal slot disposed in its circumferential wall adjacent its opposite end; a positioning pin attached to said main body portion and extending laterally outwardly therefrom through said longitudinal slot permitting said sleeve to slide axially along said body portion; a coil spring disclosed between said sleeve and said body portion adapted to urge the toothed edge of said sleeve into diametric alignment with the end of said body portion adjacent said internal threads; a radially projecting flange on and spaced from the breech end of the firing chamber, the rear face of said flange being provided with teeth formed therein, so that as said body portion of the breech cap is threaded onto said breech end of said firing chamber the teeth in the edge of said sleeve contact and slip over axially aligning teeth cut in the face of the flange of said breech end, falling into mating engagement therewith when the breech end bottoms within the breech cap body portion, and holding said parts against relative rotation until said sleeve is moved outwardly against said coil spring to disengage said teeth and permit unthreading of said breech cap.

References Cited in the file of this patent

UNITED STATES PATENTS

| | | |
|---|---|---|
| 1,725,473 | Page | Aug. 20, 1929 |
| 2,045,579 | Carlson | June 30, 1936 |
| 2,421,807 | Richey et al. | June 10, 1947 |
| 2,466,980 | Bronson | Apr. 12, 1949 |
| 2,472,653 | Eaton | June 7, 1949 |
| 2,585,870 | Spielman | Feb. 12, 1952 |

FOREIGN PATENTS

| | | |
|---|---|---|
| 609,456 | Great Britain | Sept. 30, 1948 |